United States Patent
Agarwal et al.

(10) Patent No.: US 9,534,583 B2
(45) Date of Patent: Jan. 3, 2017

(54) METHODS AND SYSTEMS TO OPERATE A WIND TURBINE

(71) Applicant: General Electric Company, Schenectady, NY (US)

(72) Inventors: Pranav Agarwal, Guilderland, NY (US); Mark Edward Cardinal, Altamont, NY (US); Nora Cheng-Huei Han, Munich (DE)

(73) Assignee: General Electric Company, Niskayuna, NY (US)

( * ) Notice: Subject to any disclaimer, the term of this patent is extended or adjusted under 35 U.S.C. 154(b) by 371 days.

(21) Appl. No.: 14/306,362

(22) Filed: Jun. 17, 2014

(65) Prior Publication Data

US 2015/0361957 A1   Dec. 17, 2015

(51) Int. Cl.
| | |
|---|---|
| *G06F 19/00* | (2011.01) |
| *F03D 7/02* | (2006.01) |
| *F03D 9/00* | (2016.01) |

(52) U.S. Cl.
CPC ........... *F03D 7/0224* (2013.01); *F03D 7/0244* (2013.01); *F03D 7/0264* (2013.01); *F03D 7/0272* (2013.01); *F03D 9/002* (2013.01); *F05B 2270/1032* (2013.01); *F05B 2270/335* (2013.01); *Y02E 10/723* (2013.01)

(58) Field of Classification Search
CPC ...... F03D 7/0276; F03D 7/043; F03D 7/0244; Y02E 10/723
USPC ........................................................ 700/287
See application file for complete search history.

(56) References Cited

U.S. PATENT DOCUMENTS

| | | | |
|---|---|---|---|
| 4,495,423 A * | 1/1985 | Rogers | F01D 7/02 |
| | | | 290/44 |
| 5,155,375 A | 10/1992 | Holley | |
| 6,137,187 A | 10/2000 | Mikhail et al. | |
| 7,704,043 B2 | 4/2010 | Kabatzke et al. | |
| 2005/0012339 A1 | 1/2005 | Mikhail et al. | |
| 2006/0132994 A1 | 6/2006 | Delmerico et al. | |
| 2008/0116690 A1 * | 5/2008 | Kabatzke | F03D 7/0276 |
| | | | 290/44 |
| 2008/0136188 A1 * | 6/2008 | Krueger | F03D 7/0276 |
| | | | 290/44 |

(Continued)

FOREIGN PATENT DOCUMENTS

| | | |
|---|---|---|
| CN | 102996335 A | 3/2013 |
| CN | 202768249 U | 3/2013 |

(Continued)

OTHER PUBLICATIONS

European Search Report and Opinion issued in connection with corresponding EP Application No. 15172498.6 on Oct. 26, 2015.

(Continued)

*Primary Examiner* — Michael D Masinick
(74) *Attorney, Agent, or Firm* — Ann M. Agosti

(57) ABSTRACT

A wind turbine system, comprising a tower, a plurality of blades, a rotor supported by the tower and rotatably coupled to the plurality of blades, a pitch control device for regulating pitch angles of the plurality of blades, a torque control device for regulating torque of the rotor, a processing subsystem programmed to slow down the wind turbine system by using the torque control device alone to slow down the rotor when the torque control device is fully capable of slowing down the rotor, and using both the torque control device and the pitch control device to slow down the rotor when the torque control device alone is not fully capable of slowing down the rotor.

17 Claims, 6 Drawing Sheets

(56) References Cited

U.S. PATENT DOCUMENTS

| | | | |
|---|---|---|---|
| 2009/0160187 A1* | 6/2009 | Scholte-Wassink | F03D 7/0284 290/44 |
| 2009/0184519 A1* | 7/2009 | Nies | F03D 7/0224 290/44 |
| 2009/0243295 A1* | 10/2009 | Kammer | F03D 7/0224 290/44 |
| 2011/0133453 A1* | 6/2011 | Merswolke | F03D 9/002 290/44 |
| 2012/0027589 A1* | 2/2012 | Haag | F03D 1/008 416/1 |
| 2012/0104757 A1 | 5/2012 | De Las Heras Carbonell et al. | |
| 2013/0088009 A1* | 4/2013 | Cousineau | F03D 7/0204 290/44 |
| 2013/0136594 A1* | 5/2013 | Casazza | F03D 7/0224 416/1 |
| 2013/0259686 A1* | 10/2013 | Blom | F03D 7/0276 416/1 |
| 2014/0050579 A1 | 2/2014 | Perley et al. | |
| 2014/0241879 A1* | 8/2014 | Fahrner | F03D 7/0244 416/1 |
| 2015/0069762 A1* | 3/2015 | Mashtare | F03D 9/002 290/55 |
| 2015/0118047 A1* | 4/2015 | Yoon | F03D 11/0091 416/1 |

FOREIGN PATENT DOCUMENTS

| | | |
|---|---|---|
| CN | 102251926 B | 9/2013 |
| EP | 2362527 A1 | 8/2011 |
| WO | 03049256 A2 | 6/2003 |
| WO | 2007086930 A3 | 4/2007 |
| WO | 2007132303 A1 | 11/2007 |
| WO | 2013083139 A2 | 6/2013 |

OTHER PUBLICATIONS

Pao et al., "A Tutorial on the Dynamics and Control of Wind Turbines and Wind Farms", 2009 American Control Conference Hyatt Regency Riverfront, St. Louis, MO, USA, pp. 2076-2089, Jun. 2009.

Spudic et al., "Hierarchical wind farm control for power/load optimization", Faculty of Electrical Engineering and Computing, pp. 1-8, 2010.

* cited by examiner

METHODS AND SYSTEMS TO OPERATE A WIND TURBINE

BACKGROUND

Wind turbines are increasingly gaining importance as renewable sources of energy generation. In recent times, wind turbine technology has increasingly been applied to large-scale power generation applications. Maximizing energy output while minimizing loads of the wind turbines in varied wind conditions is a challenge that exists in harnessing wind energy.

A wind turbine typically includes a tower and a rotor rotatably coupled to two or more blades. The blades are acted upon by a wind flow to rotate the rotor. The speed of the wind turbine is dependent upon multiple factors including angle of attack, speed of wind, and pitch angle of a blade, for example. The angle of attack is an angle between a reference line of an airfoil of the blade and a direction of the wind flow acting upon the blade. The pitch angle of a blade of a wind turbine refers to a position of the blade with respect to the direction of the wind through which the blade rotates. The pitch angle of the blade may be changed to increase or decrease the speed of the wind turbine, and/or slowdown the wind turbine. Changing a pitch angle of a blade changes the angle of attack of the blade.

Typically, when a wind turbine is shut down, a pitch controller of the wind turbine changes the pitch angles of the blades of the wind turbine towards feather. However, changing the pitch angles of the blades towards feather when a rotor of the wind turbine is rotating at a high speed may induce high loads on the wind turbine. The loads, for example, may include tower top/hub loads and rotor imbalance loads and may lead to wear and tear of the wind turbine.

Therefore, it would be advantageous to provide improved systems and methods to shut down or slow down a wind turbine.

BRIEF DESCRIPTION

In accordance with one embodiment, a wind turbine system includes a tower, a plurality of blades, a rotor supported by the tower and rotatably coupled to the plurality of blades, a pitch control device for regulating pitch angles of the plurality of blades, a torque control device for regulating torque of the rotor, and a processing subsystem programmed to slow down the wind turbine system by using the torque control device alone to slow down the rotor when the torque control device is fully capable of slowing down the rotor, and using both the torque control device and the pitch control device to slow down the rotor when the torque control device alone is not fully capable of slowing down the rotor.

In accordance with another embodiment, a method of operating a wind turbine system includes using a torque control device alone to slow down a rotor of the wind turbine system when the torque control device is fully capable of slowing down the rotor, and using both the torque control device and the pitch control device to slow down the rotor when the torque control device alone is not fully capable of slowing down the rotor.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Figure 1:
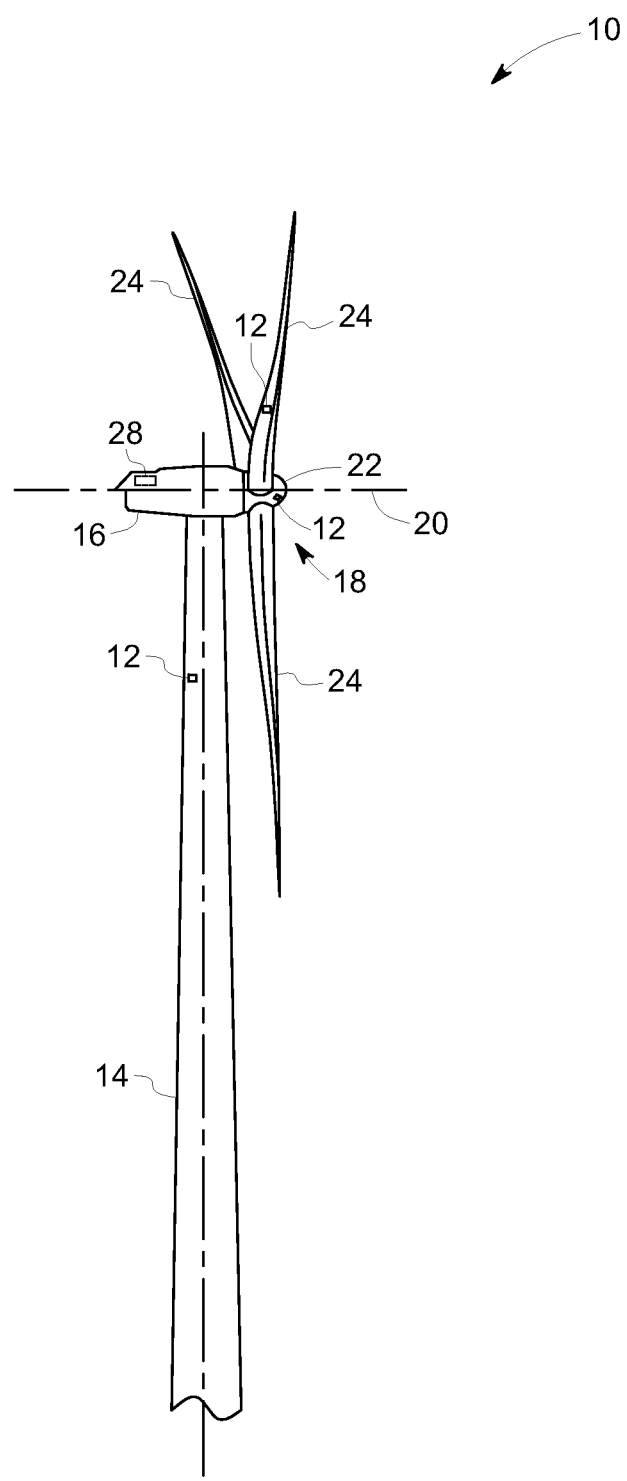
FIG. 1 is an exemplary representation of a wind turbine.

FIG. 1 is an exemplary representation of a wind turbine 10. Although the wind turbine 10 illustrated for purposes of example is a horizontal-axis electrical power generating wind turbine, in some embodiments, the wind turbine 10 may comprise a vertical-axis configuration and/or a wind mill type wind turbine (not shown). The wind turbine 10 may be coupled to a power grid (not shown) for receiving electrical power therefrom to drive operation of the wind turbine 10 and/or its associated components and/or for supplying electrical power generated by wind turbine 10 thereto. Although only one wind turbine 10 is shown, in some embodiments, a plurality of wind turbines 10 may be grouped together such that the group may be referred to as a "wind farm".

The wind turbine 10 includes a tower 14, a body 16 (sometimes referred to as a "nacelle") and a rotor 18 coupled to the body 16 for rotation with respect to the body 16 about an axis of rotation 20. The rotor 18 includes a hub 22 and one or more blades 24 extending radially outwardly from the hub 22 for converting wind energy into rotational energy. Although the rotor 18 is described and illustrated herein as having three blades 24, the rotor 18 may have any number of blades 24. The length of the blades 24 may vary depending on the application. In some embodiments, the rotor 18 generally faces upwind to harness the wind energy. In certain other embodiments, the rotor 18 faces downwind to harness the wind energy. In some embodiments, the rotor 18 may not face exactly upwind and/or downwind, but may be inclined generally at any angle (which may be variable) with respect to a direction of the wind to harness energy therefrom.

The rotor 18 may include the blades 24 of any shape, type, and configuration. For example, based on the shape, type and configuration of the blades 24, the rotor 18 may include a ducted rotor, a darrieus wind turbine rotor, a savonious wind turbine rotor, a traditional windmill rotor, or the like. The traditional windmill rotor, for example may be for pumping water, such as, but not limited to, four-bladed rotors having wooden shutters and/or fabric sails.

The wind turbine 10 further includes one or more sensors 12 coupled to one or more components of the wind turbine 10 and/or the power grid, for measuring one or more parameters of such components. The sensors 12 may include, but are not limited to, sensors configured to measure current rotor speed, current pitch angles of one or more of the blades 24, displacements, yaw, moments, strain, stress, twist, damage, failure, rotor speed, a grid anomaly in the power grid, generator speed, and/or an anomaly of power supplied to any component of the wind turbine 10.

The wind turbine 10 further includes one or more control systems 28 coupled to the sensors 12 and at least some of the components of wind turbine 10 for generally controlling operation of wind turbine 10. In the presently contemplated configuration, the control system 28 is disposed within the wind turbine 10. However, additionally or alternatively, the control system 28 may be remote from the wind turbine 10 and/or other components of the wind turbine 10. The control system 28 may be used for overall system monitoring and control including, for example, blade pitch and speed regulation, high-speed shaft and yaw brake applications, yaw and pump motor applications, and/or fault monitoring. Alternative distributed or centralized control architectures may be used in some embodiments.

Figure 2:
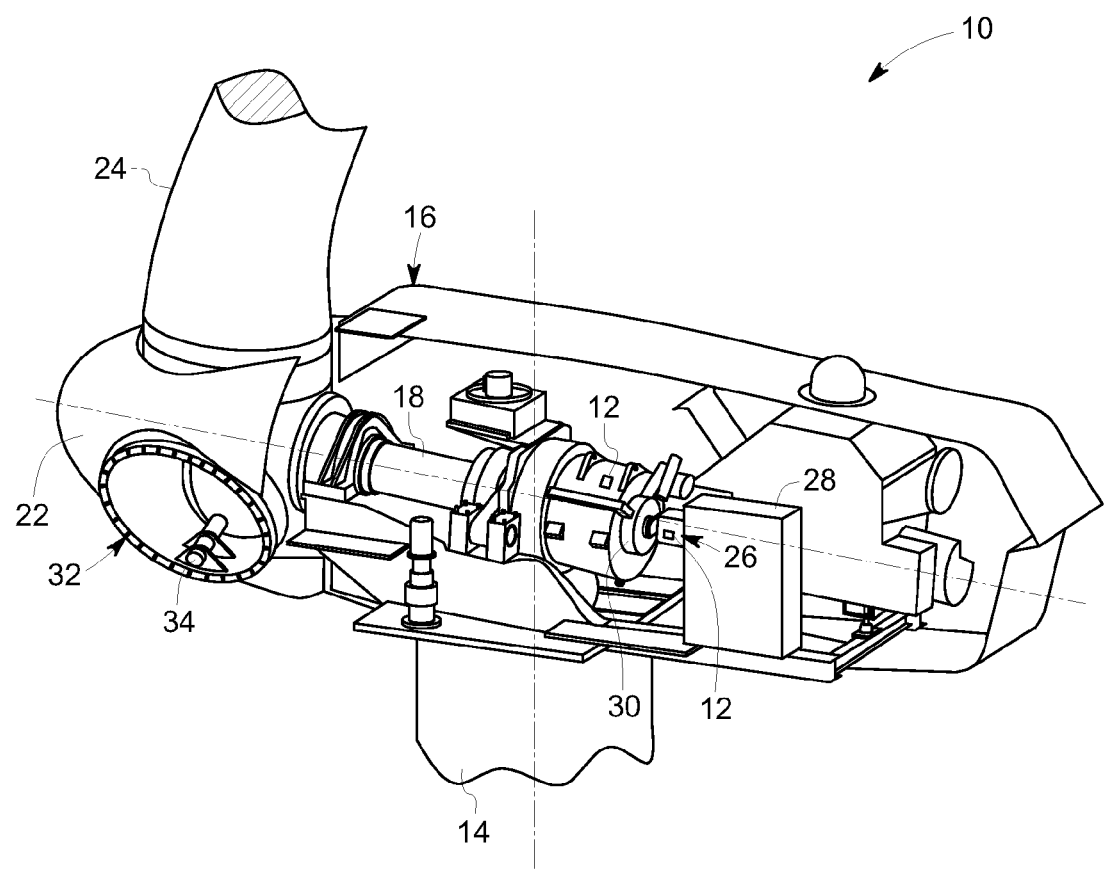
FIG. 2 is a partial-cut away perspective view of a portion of the wind turbine shown in FIG. 1.

FIG. 2 is a partial-cut away perspective view of a portion of the wind turbine 10 shown in FIG. 1. The wind turbine 10 includes an electrical generator 26 coupled to the rotor 18 for generating electrical power from the rotational energy generated by the rotor 18. In one embodiment, the electrical generator 26 is coupled to the rotor 18 via a gearbox (not shown). The electrical generator 26 may be any suitable type of electrical generator, such as, but not limited to, a wound rotor induction generator. In some embodiments, the wind turbine 10 may include a brake 30 such as, for example, a hydraulic parking brake, an electromechanical brake, a centrifugal brake, an Eddie-current brake (retarder), or a magnetic brake, for braking rotation of the rotor 18 to, for example slow rotation of the rotor 18, brake the rotor 18 against full wind speed, and/or reduce the generation of electrical power from the electrical generator 26.

The wind turbine 10 may further include a variable blade pitch system 32 for selectively controlling a pitch angle of the blades 24. In some embodiments, the pitch angles of the blades 24 are individually controlled by the variable blade pitch system 32. The variable blade pitch system 32 may include one or more actuators 34 coupled to the hub 22 and the blades 24 for changing the pitch angle of the blades 24. The actuators 34 may include but are not limited to, electrical motors, hydraulic cylinders, springs, and/or servomechanisms and may be driven by any suitable means, such as, but not limited to, hydraulic fluid, electrical power, electro-chemical power, and/or mechanical power. Additionally or alternatively, the actuators 34 may be driven by energy extracted from rotational inertia of the rotor 18, and/or a stored energy source (not shown) that supplies power to components of the wind turbine 10 during a grid anomaly in the power grid coupled to wind turbine 10.

As previously noted with reference to FIG. 1, the wind turbine 10 further includes the sensors 12 and the control system 28. The control system 28 is operationally coupled to the brake 30 and the variable pitch controller 32. As previously noted with reference to FIG. 1, the sensors 12 are positioned with respect to one or more components of the wind turbine 10 and/or the power grid, for measuring one or more parameters of such components. Although the exemplary sensors 12 are illustrated herein as coupled to various components of wind turbine 10, including the tower 14, the plurality of blades 24, and the hub 22, the sensors 12 illustrated herein are not limited to the components each sensor is shown as coupled to, nor the location shown on such components. Rather, the sensors 12 may be coupled to any component of the wind turbine 10 and/or the power grid at any location thereof for measuring any parameter thereof.

Figure 3:
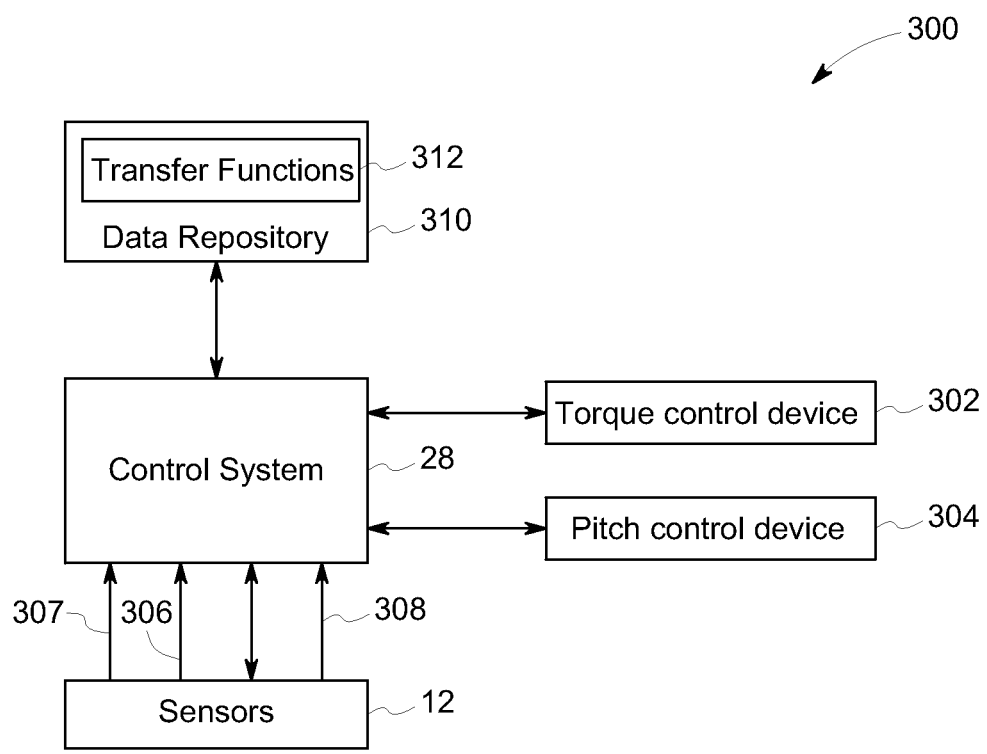
FIG. 3 is a block diagram of a control system and control devices for use with the wind turbine shown in FIGS. 1 and 2.

FIG. 3 is a block diagram 300 of the control system 28 described in conjunction with a torque control device 302 and a pitch control device 304 to slow down or shut down the rotor 18 and/or the wind turbine 10, in accordance with certain embodiments of the present disclosure. As used herein, the term "slow down" is used to refer to reduction of a current speed or torque of the rotor 18. The term "shut down" is a more specific variant of slow down wherein the slow down of the rotor 18 is substantially towards zero.

The control system 28, may comprise a processing subsystem, a dynamic controller, a proportional-integral-derivative controller (PID), a proportional-integral controller, an integral-derivative, a proportional-derivative controller, a microprocessor, a microchip, or the like, for example. Although for purposes of illustration, the control system 28 is illustrated as operationally coupled to the torque control device 302 and the pitch control device 304, in another embodiment at least some of the various control functions may be included in an integral system. In one embodiment, the torque control device 302 includes a processing device that generates control commands for regulating the torque of the rotor 18. In another embodiment, the torque control device 302 further includes a structural element that has a capability to apply a counter torque on the rotor 18 to regulate the speed of the rotor 18. For example, the torque control device 302 may be considered as including the electrical generator 26 referred to in FIG. 1. For example, the torque control device 302 may further include a converter, a battery storage device and/or a shunt resistor load. The pitch control device 304 includes a device that regulates the pitch angles/collective pitch angle of the blades 24. In one embodiment, the pitch control device 304 includes a processing device that sends command for regulating the pitch angles of the blades 24. In some embodiments, the pitch control device 304 may also include the variable blade pitch system 32 and/or the actuators 34 described in FIG. 1.

As previously noted with reference to FIG. 1 and FIG. 2, the control system 28 is operationally coupled to the sensors 12 which may generate signals representative of current rotor speed 306 of the rotor 18, current pitch angles 308 of the blades 24, and/or current rotor acceleration 307 of the rotor 18. Additionally, the control system 28 may be operationally coupled to a data repository 310. The data repository 310 stores transfer functions 312 that define pitch control dynamics and torque control dynamics of the wind turbine 10. For example, the transfer functions 312 may include one transfer function defining torque control dynamics of the wind turbine 10 that may be represented by the following equation (1), and another transfer function defining pitch control dynamics of the wind turbine 10 may be represented by the following equation (2).

$$N\delta T_{gen} = \\ -\frac{\partial M_z \text{Aero}}{\partial w_r} \partial w_r - K_{Pw_r}\delta w_r + K_{Iw_r}\int(\delta w_{r,ref} - \delta w_r) - K_{D,w_r}\delta w_r \quad (1)$$

$$\frac{\partial M_z \text{Aero}}{\partial \theta}\partial\theta = -\frac{\partial M_z \text{Aero}}{\partial w_r}\partial w_r - K_{Pw_r}\delta w_r + \\ K_{Iw_r}\int(\delta w_{r,ref} - \delta w_r) - K_{D,w_r}\delta w_r + N\delta T_{gen} \quad (2)$$

wherein $\phi M_z$Aero is aerodynamic torque, $K_{Pw_r}$ a proportional control gain, $\delta T_{gen}$ is required counter torque, $K_{D,w_r}$ is a derivative control gain, $K_{Iw_r}$ is an integral control gain, $\delta s_{r,ref}$ is the commanded rotor speed, $\phi w_r$ is current rotor speed, N is gear ratio of a gearbox, $\delta w_r$ is current rotor acceleration, and $\phi\theta$ is a collective current pitch angle of the blades 24.

In the presently contemplated configuration, when the need to slow down the wind turbine 10 occurs, the control system 28 first determines whether the torque control device 302 alone is fully capable of carrying out the slow down. In one specific embodiment, the control system 28 makes such a determination based upon the one or more of the transfer functions 312 and information from the sensors 12 regarding the current rotor speed 306, the current rotor acceleration 307, and the current collective pitch angle 308. The torque control device 302 alone is fully capable to slow down the rotor 18 when a required counter torque for the slowdown of the rotor 18 is less than or equal to an available counter torque corresponding to the torque control device 302. The required counter torque for the slow down of the rotor 18, for example, may not be less than or equal to the available counter torque when the torque control device 302 is being used for reducing one or more loads, such as blade edge oscillations, tower side-side oscillations, drive train oscillations, or the like. In some instances, the torque control device 302 alone may be also fully capable when the available counter torque is substantially close to (such as 90% or greater than) the required counter torque. As used herein, the term "available counter torque" includes an amount of counter torque that is available with the torque control device 302 or a maximum rated counter torque that may be commanded from the torque control device 302 at a given time. As used herein, the term "required counter torque" includes an amount of torque that is required to slow down the rotor 18.

When the control system 28 determines that the torque control device 302 alone is fully capable to slow down the rotor 18, the control system 28 uses only the torque control device 302 to slow down the rotor 18/wind turbine 10 and thus leaves the pitch control device 304 available for tasks other than the slow down of the rotor 18 such as tasks that reduce loads acting on the wind turbine 10. The other tasks, for example may include regulating an imbalance of the rotor 18, constraining a deflection of the tower 14, or both during the slowdown of the rotor 18.

When the control system 28 determines that the torque control device 302 alone is not fully capable to slow down the rotor 18, the control system 28 uses the pitch control device 304 in addition to the torque control device 302 to slow down the rotor 18. In one embodiment, the control device 28 uses as much counter torque as possible from the torque control device 302 and uses support from the pitch control device 304 to slow down of the rotor 18.

Figure 4:
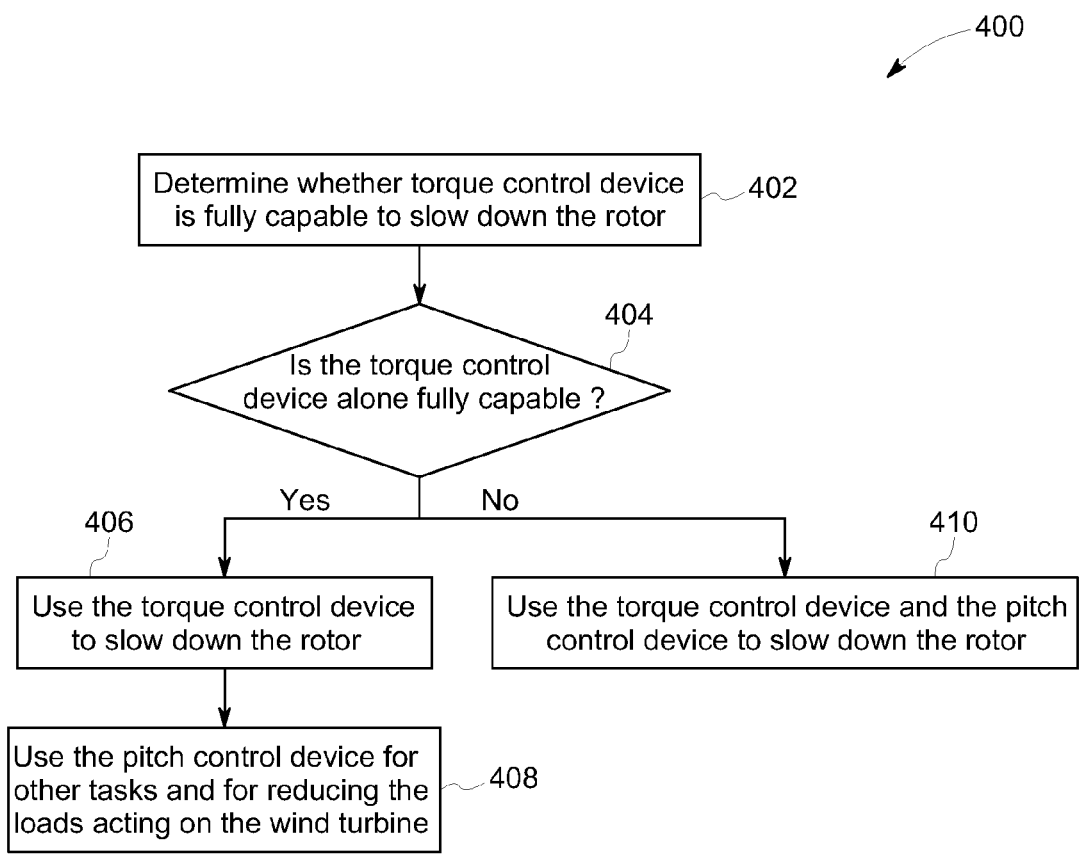
FIG. 4 is a flow chart illustrating a method to operate a wind turbine such as shown in FIGS. 1 and 2.

FIG. 4 is a flow chart illustrating a method 400 to operate the wind turbine 10 in accordance with one embodiment of the present invention, wherein the torque control device 302 and the pitch control device 304 are used in a coordinated fashion, such that the pitch control device 304 is made substantially available for the other tasks and for reducing loads acting on the wind turbine 10. At block 402, it is determined whether the torque control device 302 alone is fully capable of slowing down the rotor 18. The step 402, for example may be executed by the control system 28 as discussed with respect to FIG. 3. At block 404, when it is determined that the torque control device 302 alone is fully capable, the control is transferred to block 406.

At block 406, the torque control device 302 is used for slowing down the rotor 18. The torque control device 302, for example, may be used by substantially applying the required counter torque via the torque control device 302 on the rotor 18. For example, when the torque control device 302 is the electrical generator 26, the required counter torque may be applied on the rotor 18 using the electrical generator 26. By using the torque control device 302 to slow down the rotor 18, the pitch control device 304 is made available to execute other tasks such as reducing the loads acting on the wind turbine 10 at block 408. At block 404, when it is determined that the torque control device 302 alone is not fully capable, the control is transferred to block 410. At block 410, the torque control device 302 and the pitch control device 304 are used to slow down the rotor 18.

Figure 5:
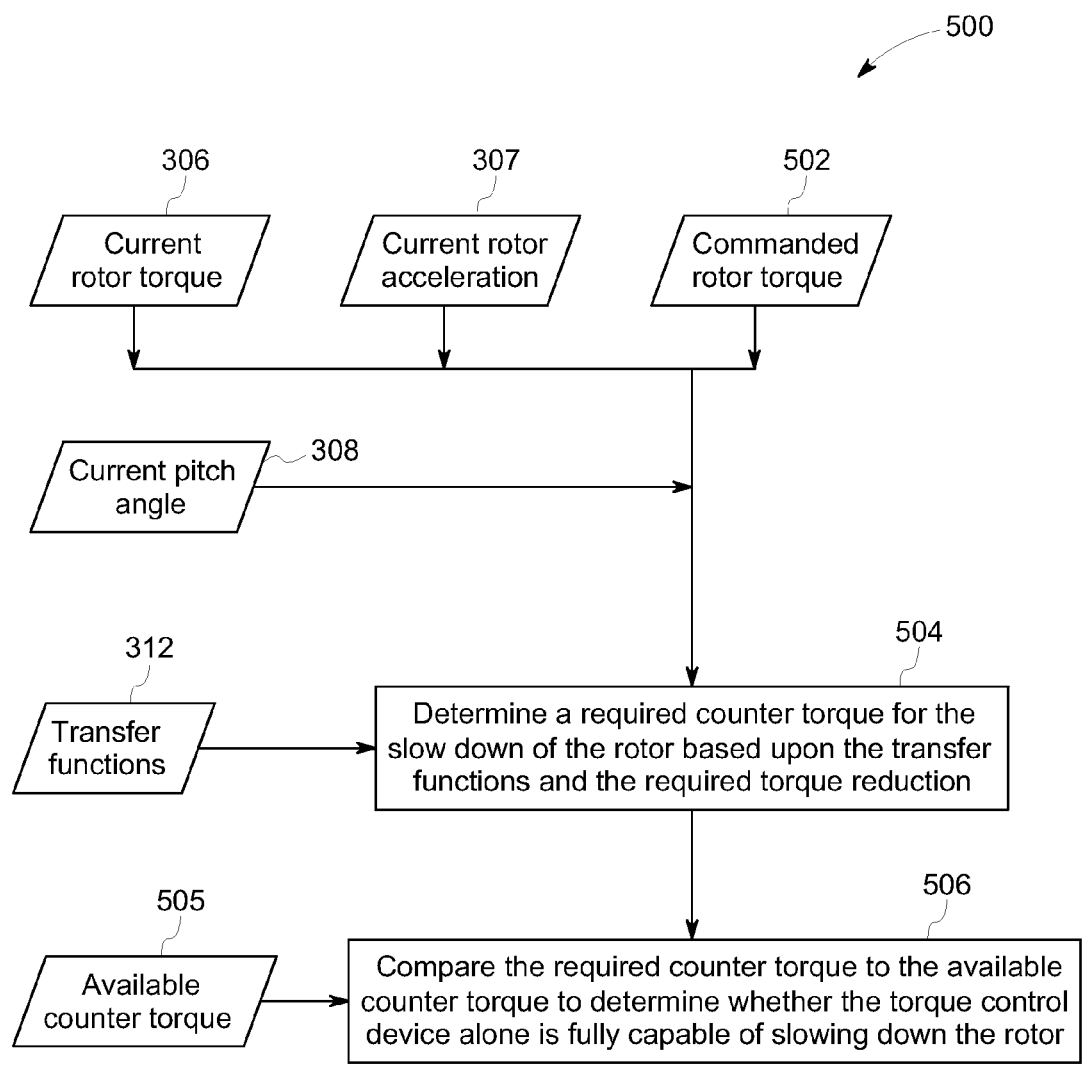
FIG. 5 is a flow chart illustrating a more specific option for a step from the flow chart of FIG. 4.

FIG. 5 is a flow chart illustrating an exemplary method 500 to determine whether the torque control device 302 alone is fully capable to slow down the rotor 18, in accordance with one embodiment of the present invention. In one embodiment, FIG. 5 explains step 402 of FIG. 4 in greater detail. As previously noted with reference to FIG. 3, reference numeral 306 is representative of current rotor speed of the rotor 18, reference numeral 307 is representative of current rotor acceleration of the rotor 18, reference numeral 308 is representative of current collective pitch angle of the blades 24, and reference numeral 312 is representative of the transfer functions. Furthermore, reference numeral 502 is representative of commanded rotor toque of the rotor 18. When the wind turbine 10 is shut down, the commanded rotor speed 502 is substantially zero.

At block 504, the required counter torque (referred to in FIG. 3) for the slow down of the rotor 18 is determined. The required counter torque, for example is determined at least in part based upon the transfer functions 312. In the presently contemplated configuration, the required counter torque is determined based upon the transfer functions 312, the current rotor speed 306, the current rotor acceleration 307, the current collective pitch angle 308, the commanded rotor speed 502, or the like. In one embodiment, the required counter torque may be determined using the equation 1.

Reference numeral 505 is representative of the available counter torque referred to in FIG. 3. The available counter torque 505, for example, may be determined, for example, based upon the torque characteristics of the electrical generator 26 with respect to the electrical generator's 26 speed, the state of one or more actuators, and/or the brake 30. Alternatively or additionally, the available counter torque 505 may be a function of other control algorithm requirements. Finally, at block 506, the required counter torque is compared to the available counter torque 505 to determine whether the torque control device 302 alone is fully capable of slowing down the rotor 18. As discussed with respect to FIG. 3, the torque control device 302 alone is fully capable to slow down the rotor 18 when a required counter torque for the slowdown of the rotor 18 is less than or equal to an available counter torque 505 corresponding to the torque control device 302. The required counter torque for the slow down of the rotor 18, for example, may not be less than or equal to the available counter torque when the torque control device 302 is being used for reducing one or more loads, such as blade edge oscillations, tower side-side oscillations, drive train oscillations, or the like. Furthermore, in some instances, the torque control device 302 alone may be also fully capable when the available counter torque is substantially close to (such as 90% or greater than) the required counter torque.

Figure 6:
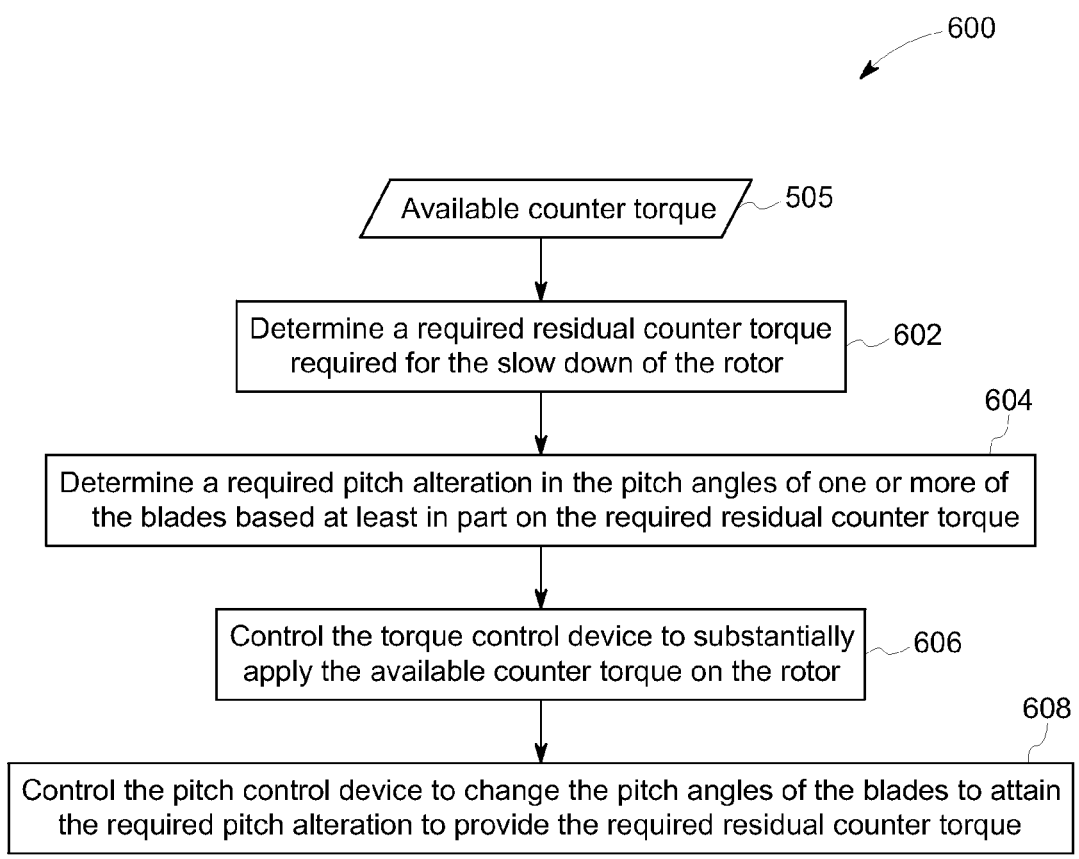
FIG. 6 is a flow chart illustrating another more specific option for a step from the flow chart of FIG. 4.

FIG. 6 is a flow chart illustrating an exemplary method 600 for using the torque control device 302 and the pitch control device 304 when the torque control device 302 alone is not fully capable of slowing down the rotor 18, in accordance with one embodiment of the present invention. At block 602 a required residual counter torque for the slow down of the rotor 18 is determined. In one embodiment, the required residual counter torque is determined when the torque control device 302 alone is not fully capable of slowing down the rotor 18. The required residual counter torque, for example, may be determined using the following equation (3):

$$\text{Required residual counter torque} = \text{Required counter torque} - \text{Available counter torque of the rotor} \quad (3)$$

At block 604, a required pitch alteration is determined based upon the required residual counter torque. In one embodiment, the required pitch alteration may further be determined based upon the current pitch angle 308, or the like. In one embodiment, the required pitch alteration may be determined based upon the current pitch angle 308, the required residual counter torque, one or more aerodynamics sensitivities, or combinations thereof. For example, the aerodynamic sensitivities may include rate of change of aerodynamic load with respect to rate of change of pitch angle. In one embodiment, the required pitch alteration may be determined using the following equation (4):

$$\delta\theta = \frac{\partial M_z \text{Aero}}{\partial \theta} * (\text{required residual counter torque}) * N \quad (4)$$

$$\frac{\partial M_z \text{Aero}}{\partial \theta}$$

wherein $\delta\theta$ is required pitch alteration, is an aerodynamic sensitivity, N is gear ratio of a gearbox (not shown).

At block 606 the torque control device 302 is controlled to substantially apply the available counter torque 505 from the torque control device 302 on the rotor 18, and at block 608 the pitch control device 304 may be controlled to change the pitch angles or the collective pitch angle of the blades 24 to attain the remaining required pitch alteration. The change in the pitch angles or the collective pitch angle to attain the required pitch alteration results in the slow down of the rotor 18.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine system, comprising:
a tower;
a plurality of blades;
a rotor supported by the tower and rotatably coupled to the plurality of blades;
a pitch control device for regulating pitch angles of the plurality of blades;
a torque control device for regulating torque of the rotor;
a processing subsystem programmed to slowdown the wind turbine system by:
determining a required counter torque for the slowdown of the rotor;
determining that the torque control device is fully capable of slowing down the rotor when the required counter torque for the slowdown of the rotor is less than or equal to an available counter torque corresponding to the torque control device;
determining that the torque control device is not fully capable of slowing down the rotor when the required counter torque for the slowdown of the rotor is greater than the available counter torque corresponding to the torque control device;
determining a required residual counter torque required for the slowdown of the rotor when the torque control device is not fully capable of slowing down the rotor; and
determining a required pitch alteration in the pitch angles of one or more of the plurality of blades based at least in part on the required residual counter torque;
using the torque control device alone to slowdown the rotor when the torque control device is fully capable of slowing down the rotor; and
using both the torque control device and the pitch control device to slowdown the rotor when the torque control device alone is not fully capable of slowing down the rotor.

2. The wind turbine system of claim 1, wherein the processing subsystem is further programmed to use the pitch control device for tasks other than the slowdown of the rotor when the torque control device is fully capable of slowing down the rotor.

3. The wind turbine system of claim 2, wherein the tasks comprise regulating an imbalance of the rotor, constraining a deflection of the tower, or both.

4. The wind turbine system of claim 1, wherein the required counter torque for the slowdown of the rotor is based upon a plurality of transfer functions that define pitch control dynamics and torque control dynamics of the wind turbine system, a current rotor speed and a commanded rotor speed, or combinations thereof.

5. The wind turbine system of claim 1, wherein the processing subsystem determines the required pitch alteration in the pitch angles of the one or more of the plurality of blades based upon current aerodynamic torque of the rotor, current pitch angles of the plurality of blades, gear ratio of a gearbox, the required residual counter torque, or combinations thereof.

6. The wind turbine system of claim 1, wherein the processing subsystem is programmed to use the torque control device when the torque control device is fully capable of slowing down the rotor by controlling the torque control device to apply the required counter torque on the rotor.

7. The wind turbine system of claim 6, wherein the processing subsystem is programmed to use the torque control device and the pitch control device to slowdown the rotor when the torque control device alone is not fully capable of slowing down the rotor by:
controlling the torque control device to apply the available counter torque on the rotor; and
controlling the pitch control device to change the pitch angles of the plurality of blades to attain the required pitch alteration.

8. A method of operating a wind turbine system, comprising:
using a torque control device to slowdown a rotor of the wind turbine system when the torque control device is fully capable of slowing down the rotor;
using both the torque control device and the pitch control device to slowdown the rotor when the torque control device alone is not fully capable of slowing down the rotor;
determining a required counter torque for the slowdown of the rotor;

determining a residual counter torque required for the slowdown of the rotor when the torque control device is not fully capable of slowing down the rotor; and determining a required pitch alteration in the pitch angles of one or more of the plurality of blades based at least in part on the required residual counter torque.

9. The method of claim 8, further comprising the step of using the pitch control device for tasks other than the slowdown of the rotor when the torque control device is fully capable of slowing down the rotor.

10. The method of claim 8, wherein the required counter torque for the slowdown of the rotor is based upon a plurality of transfer functions that define pitch control dynamics and torque control dynamics of the wind turbine system, a current rotor speed and a commanded rotor speed, or combinations thereof.

11. The method of claim 8, further comprising determining that the torque control device is fully capable of slowing down the rotor when the required counter torque for the slowdown of the rotor is less than or equal to an available counter torque corresponding to the torque control device.

12. The method of claim 8, further comprising determining the required pitch alteration in the pitch angles of the one or more of the plurality of blades based upon current aerodynamic torque of the rotor, current pitch angles of the plurality of blades, gear ratio of a gearbox, the residual counter torque, or combinations thereof.

13. The method of claim 8, further comprising using the torque control device when the torque control device is fully capable of slowing down the rotor by controlling the torque control device to apply the required counter torque on the rotor.

14. The method of claim 13, further comprising when the torque control device is not fully capable of slowing down the rotor by controlling the torque control device to apply the required counter torque on the rotor by:

controlling the torque control device to apply the available counter torque on the rotor; and controlling the pitch control device to change the pitch angles of the plurality of blades to attain the required pitch alteration to provide the required residual counter torque.

15. A wind turbine system, comprising:
a tower;
a plurality of blades;
a rotor supported by the tower and rotatably coupled to the plurality of blades;
a pitch control device for regulating pitch angles of the plurality of blades;
a torque control device for regulating torque of the rotor;
a processing subsystem programmed to slowdown the wind turbine system by:
  determining a required counter torque for the slowdown of the rotor;
  determining that the torque control device is fully capable of slowing down the rotor when the required counter torque for the slowdown of the rotor is less than or equal to an available counter torque corresponding to the torque control device;
  determining that the torque control device is not fully capable of slowing down the rotor when the required counter torque for the slowdown of the rotor is greater than the available counter torque corresponding to the torque control device;
  determining a required residual counter torque required for the slowdown of the rotor when the torque control device is not fully capable of slowing down the rotor; and
  determining a required pitch alteration in the pitch angles of one or more of the plurality of blades based at least in part on the required residual counter torque;
  using the torque control device alone to slowdown the rotor when the torque control device is fully capable of slowing down the rotor; and
  using the pitch control device during slowdown of the rotor for tasks other than the slowdown of the rotor when the torque control device is fully capable of slowing down the rotor.

16. The wind turbine system of claim 15, wherein the tasks comprise regulating an imbalance of the rotor, constraining a deflection of the tower, or both.

17. The wind turbine system of claim 15, wherein the tasks comprise reducing loads acting on the wind turbine.

* * * * *

UNITED STATES PATENT AND TRADEMARK OFFICE
CERTIFICATE OF CORRECTION

PATENT NO. : 9,534,583 B2
APPLICATION NO. : 14/306362
DATED : January 3, 2017
INVENTOR(S) : Agarwal et al.

It is certified that error appears in the above-identified patent and that said Letters Patent is hereby corrected as shown below:

In the Drawings

In Fig. 5, Sheet 5 of 6, for Tag "306", in Line 2, delete "torque" and insert -- speed --, therefor.

In the Specification

In Column 2, Line 53, delete "savonious" and insert -- savonius --, therefor.

In Column 4, Line 61, delete "ϕ$M_z$Aero" and insert -- ∂$M_z$Aero --, therefor.

In Column 4, Line 61, delete "$K_{Pw}$, a" and insert -- $K_{Pwr}$ is a --, therefor.

In Column 4, Line 63, delete "$K_{\gamma w_r}$" and insert -- $K_{\dot{w}_r}$ --, therefor.

In Column 4, Line 64, delete "δ$s_{r,ref}$" and insert -- δ$w_{r,ref}$ --, therefor.

In Column 4, Line 64, delete "ϕ$w_r$" and insert -- ∂$w_r$ --, therefor.

In Column 4, Line 66, delete "ϕθ" and insert -- ∂θ --, therefor.

In Column 5, Line 33, delete "18/wind" and insert -- 18 of wind --, therefor.

In Column 6, Line 21, delete "toque" and insert -- torque --, therefor.

In Column 6, Line 23, delete "rotor speed 502" and insert -- rotor torque 502 --, therefor.

Signed and Sealed this
Sixth Day of June, 2017

Michelle K. Lee
*Director of the United States Patent and Trademark Office*

CERTIFICATE OF CORRECTION (continued)
U.S. Pat. No. 9,534,583 B2

In Column 6, Line 32, delete "rotor speed 502," and insert -- rotor torque 502, --, therefor.

In Column 7, Lines 27-28, delete " $\frac{\partial M_{Aero}}{\partial \theta}$ " and insert the same at Line 30, after "alteration,".